US008028424B2

(12) United States Patent
Legrand

(10) Patent No.: US 8,028,424 B2
(45) Date of Patent: Oct. 4, 2011

(54) CUTTING HEAD FOR A BRUSH CUTTER, EDGE TRIMMER OR SIMILAR

(75) Inventor: Emmanuel Legrand, Villeneuve (FR)

(73) Assignee: Speed France (FR)

(*) Notice: Subject to any disclaimer, the term of this patent is extended or adjusted under 35 U.S.C. 154(b) by 601 days.

(21) Appl. No.: 12/085,041

(22) PCT Filed: May 15, 2007

(86) PCT No.: PCT/IB2007/002750
§ 371 (c)(1),
(2), (4) Date: May 13, 2008

(87) PCT Pub. No.: WO2008/139246
PCT Pub. Date: Nov. 20, 2008

(65) Prior Publication Data
US 2009/0293290 A1 Dec. 3, 2009

(51) Int. Cl.
*A01D 34/416* (2006.01)
(52) U.S. Cl. ............................................ 30/276; 30/347
(58) Field of Classification Search .................. 30/276, 30/347; 56/17.2, 295
See application file for complete search history.

(56) References Cited

U.S. PATENT DOCUMENTS

| 3,580,209 A | * | 5/1971 | Olson ............................ 114/218 |
| 4,301,642 A | | 11/1981 | Thurber |
| 4,348,974 A | * | 9/1982 | Lerner .......................... 114/218 |
| 4,355,510 A | | 10/1982 | Ruseff |
| 4,411,069 A | * | 10/1983 | Close et al. ..................... 30/276 |
| 4,830,340 A | | 5/1989 | Knitig |
| 5,784,979 A | * | 7/1998 | Nelson, III .................... 114/218 |
| 5,931,112 A | * | 8/1999 | Lacan ........................... 114/218 |
| 6,347,455 B2 | * | 2/2002 | Brant et al. ..................... 30/276 |
| 6,519,857 B1 | * | 2/2003 | Proulx et al. ................... 30/276 |
| 6,581,292 B2 | * | 6/2003 | Allis .............................. 30/276 |
| 6,928,741 B2 | | 8/2005 | Proulx et al. |
| 7,257,898 B2 | * | 8/2007 | Iacona ............................ 30/276 |
| 7,587,828 B2 | * | 9/2009 | Legrand ......................... 30/276 |
| 2007/0084061 A1 | | 4/2007 | Bennett |

FOREIGN PATENT DOCUMENTS

| EP | 0824854 A2 | 2/1998 |
| WO | 03015497 A1 | 2/2003 |
| WO | 03020008 A1 | 3/2003 |
| WO | 2006017372 A1 | 2/2006 |

OTHER PUBLICATIONS

International Search Report and Written Opinion, PCT/IB2007/002750, dated Feb. 6, 2008.

* cited by examiner

*Primary Examiner* — Hwei C Payer
(74) *Attorney, Agent, or Firm* — Lerner, David, Littenberg, Krumholz & Mentlik, LLP

(57) ABSTRACT

The invention relates to a cutting head for a brush cutter, edge trimmer or similar, the head being of the type including at least a passageway for a cutting string and a locking element of the cutting string. The cutting head is characterized in that the locking elements include at least one ratchet wheel, including a toothed wheel mounted in rotation around an axis in such a manner that said teeth project in the passageway. The ratchet can be arranged in such a way that the toothed wheel can turn in a given direction to allow the introduction of the cutting string in the passageway and cannot turn in the opposite direction, thereby locking the cutting string in the passageway.

14 Claims, 4 Drawing Sheets

CUTTING HEAD FOR A BRUSH CUTTER, EDGE TRIMMER OR SIMILAR

CROSS-REFERENCE TO RELATED APPLICATIONS

The present application is a national phase entry under 35 U.S.C. §371 of International Appln. No. PCT/IB2007/002750 filed May 15, 2007, the disclosure of which is hereby incorporated herein by reference.

FIELD OF THE INVENTION

The present invention relates in general to the field of spinning-string implements for cutting vegetation, such as mowers, trimmers, etc., and more particularly to a locking element in order to hold firmly the string relative to the rotary cutting head on which they are mounted.

BACKGROUND OF THE INVENTION

Portable apparatus for cutting vegetation are well known in the art. Such apparatus generally comprise a heat engine or an electric engine at the end of a shaft. The engine, located at the vicinity of a handle, drives in rotation at a high speed of generally about several thousand rounds per minute. A cutting head holds one or a plurality of cutting strings. The one or the plurality of cutting strings extend more or less radially with respect to the axis of rotation under the effect of centrifugal force when the cutting head is driven in rotation. There are essentially two kinds of cutting heads having a locking element of the cutting string. A first kind of cutting head includes a reel receiving a cutting string wound to the reel, where the cutting string progressively winds off the reel as the cutting string wears away.

The second kind of cutting head includes a locking element of one or a plurality of cutting strings of short length.

The locking element that holds the cutting string onto the cutting head usually comprises one or a plurality of string strand passageways formed by metallic or similar eyelets mounted on a peripheral surface of the head. It is through these passageways that respective strands of string emerge from the head. The strand of string comprises a stop. Besides a high production cost induced by the stop, it is difficult to replace the cutting string onto the cutting head described above in the course of use because the user is generally wearing gloves.

To overcome this drawback, various locking elements for use with a cutting string have been proposed.

Most of these locking elements of the cutting string strand comprise a moving locking element, such as a cam, which is urged by a spring and/or by the centrifugal force generated during rotation of the head so as to exert pressure on the string. A supporting backing wall may be provided opposite the locking element in order to hold the string locally captive between the element and the supporting wall. Examples of locking elements are shown and described in U.S. Pat. Nos. 4,301,642 and 4,355,510, as well as European Patent No. EP 0824854. To improve the locking effect, it is also known to provide the locking element with a series of teeth capable of anchoring better in the material of the string, which is generally made of polyamide. U.S. Pat. No. 6,928,741 and European Patent No. EP 1416786 show a locking element comprising a cam provided with teeth and cooperating with a spring.

The teeth provide a better locking effect when used with a smooth cutting string strand, but are inoperative when used with a toothed cutting string as disclosed in European Patent Appln. No. EP 1422990, filed by the applicant and marketed under the Trademark Flexiblade©.

One of the objects of the invention is thus to remedy these drawbacks by proposing a cutting head for a brush cutter, edge trimmer, or similar comprising at least one cutting string strand passageway and a locking element of said cutting string of simple design, low cost and achieving the locking of smooth and/or toothed cutting string strand.

SUMMARY OF THE INVENTION

To this end, and in accordance with the invention, there is proposed a cutting head for a brush cutter, edge trimmer or similar, the head being of the type including at least a passageway for a cutting string and a locking element of said cutting string. The cutting head is noteworthy in that the locking element includes at least one ratchet wheel including a toothed wheel mounted in rotation around an axis in such a manner that said teeth project in the passageway. The locking element may also include a ratchet arranged in such a way that the toothed wheel can turn in a given direction to allow the introduction of the cutting string in the passageway and can not turn in the opposite direction to lock the cutting string in the passageway. The ratchet preferably includes a cam pin pivotally mounted around an axis whose distal end can lodge itself between two successive teeth of the toothed wheel. The ratchet further cooperates with a return spring of the cam pin to maintain the cam pin between two successive teeth of the toothed wheel.

The return spring is a coiled spring extending in a blind hole of the cuffing head, the end of the coiled spring leaning against the bottom and, respectfully, the median part of the cam pin, the cam pin being, for example, a parallelepiped rod. The toothed wheel comprises between 9 and 15, and preferably 12, teeth. Moreover, teeth of the toothed wheel have a complementary shape to the teeth shape of a toothed cutting string introduced in the passageway.

The teeth of the toothed wheel have a straight edge or a concave edge, the concavity of teeth edges having a curvilinear shape or a generally V-shape. In another embodiment, each toothed wheel comprises a central hole with an oblong shape, the axis extending into the central hole in such a manner that cutting string strand of different sizes can be introduced in the passageway zone.

Finally, the cutting head comprises two parallel passageways extending symmetrically on both sides of the rotation axis of the cutting head, each passageway including a ratchet wheel.

Further advantages and characteristics will become more apparent from the following description of a plurality of variant embodiments that are given by way of nonlimiting examples of the cutting head for a brush cutter according to the invention, with reference to the appended drawings.

BRIEF DESCRIPTION OF THE DRAWINGS

The present invention will be better understood on reading the following detailed description of non-limiting embodiments thereof, and on examining the accompanying drawings, in which.

DETAILED DESCRIPTION

Figure 1:
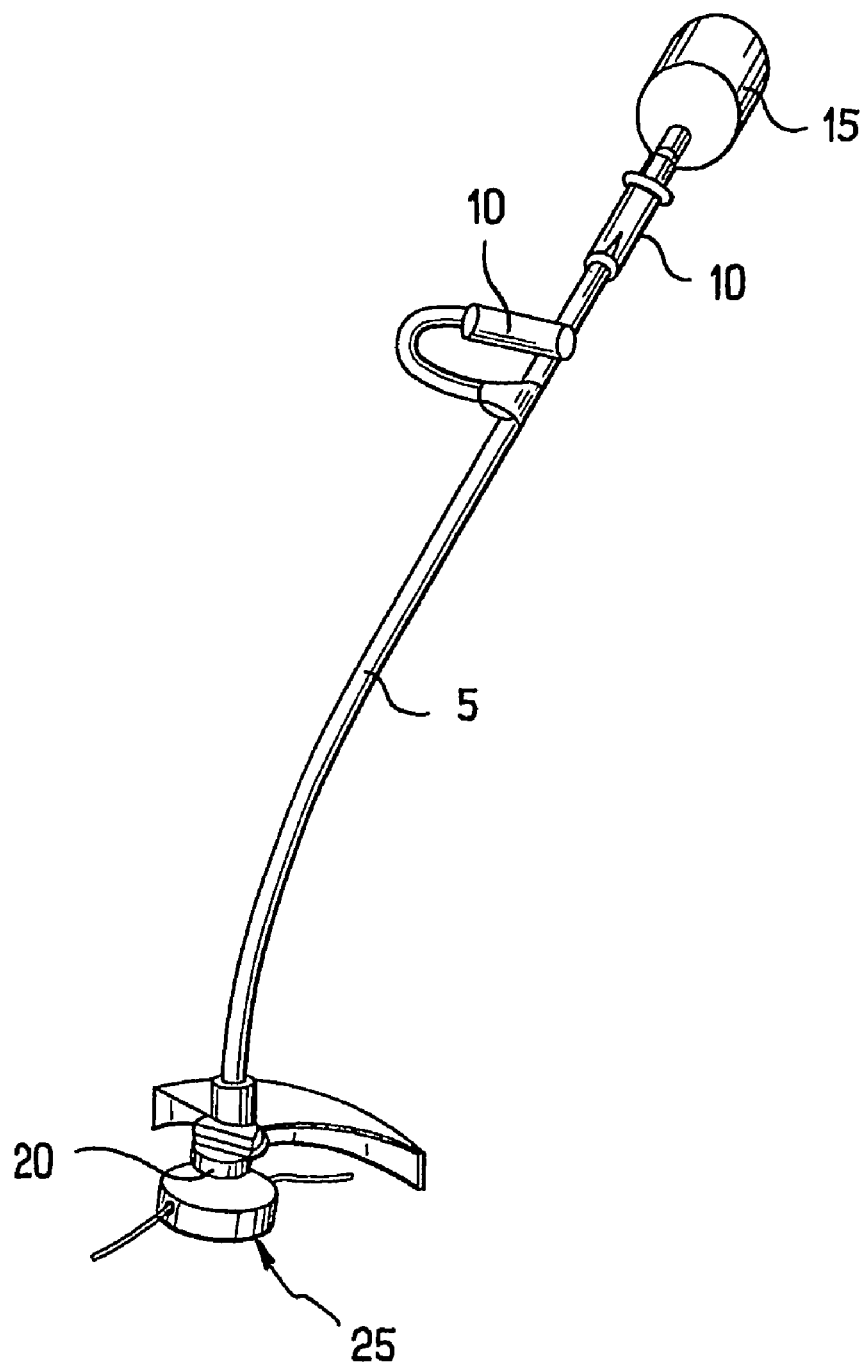
FIG. 1 shows a perspective view of a brush cutter including a cutting head according to the invention.
Figure 2:
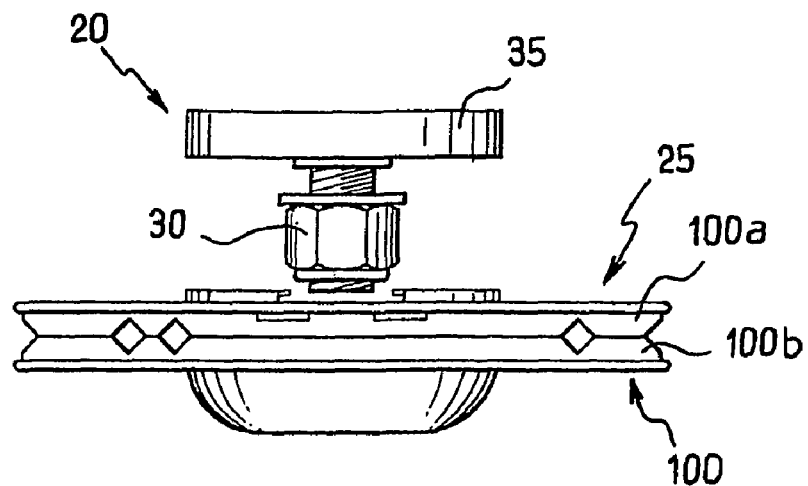
FIGS. 2-4 show three side elevation views illustrating a cutting head according to one embodiment of the invention.
Figure 3:
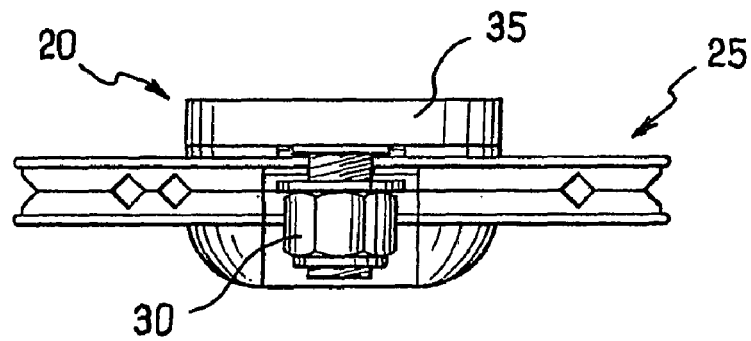

Referring to the drawings, wherein like reference numerals represent like elements, there is shown in FIG. 1 a brush cutter. The brush cutter usually comprises a shaft 5 including handles 10 and an electric or heat engine 15 driving a drive shaft 20, a cutting head 25 being mounted at the distal end of the drive shaft 20. FIGS. 1-3 represent a cutting head 25 for a brush cutter, edge trimmer, and similar according to the invention, the cutting head suitable for being mounted on the extremity of a drive shaft 20. The drive shaft 20 is provided for the purpose of fixing arrangements 30 such as washer, nut, mechanism of indexation in rotation, as well as a counterplate 35, intended to cooperate with the fixing arrangements in a manner completely conventional in itself.

The cutting head 25 is implemented here by overlaying and assembling two disc-shaped parts 100a and 100b concentric with the axis of rotation of the drive shaft 20. Each disc-shaped part 100a and 100b comprises, on its face turned one towards the other, arrangements for running of strands of string and for retaining those strands, as will be discussed in detail below.

Figure 4:
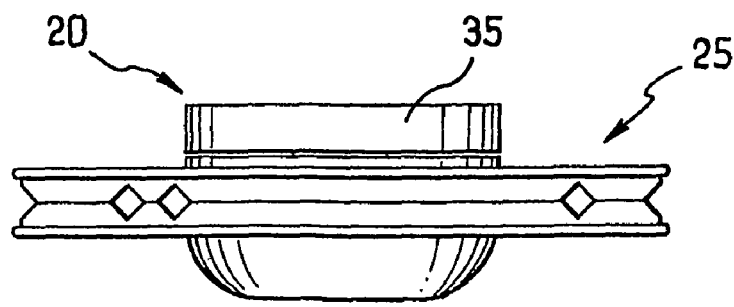
Figure 5:
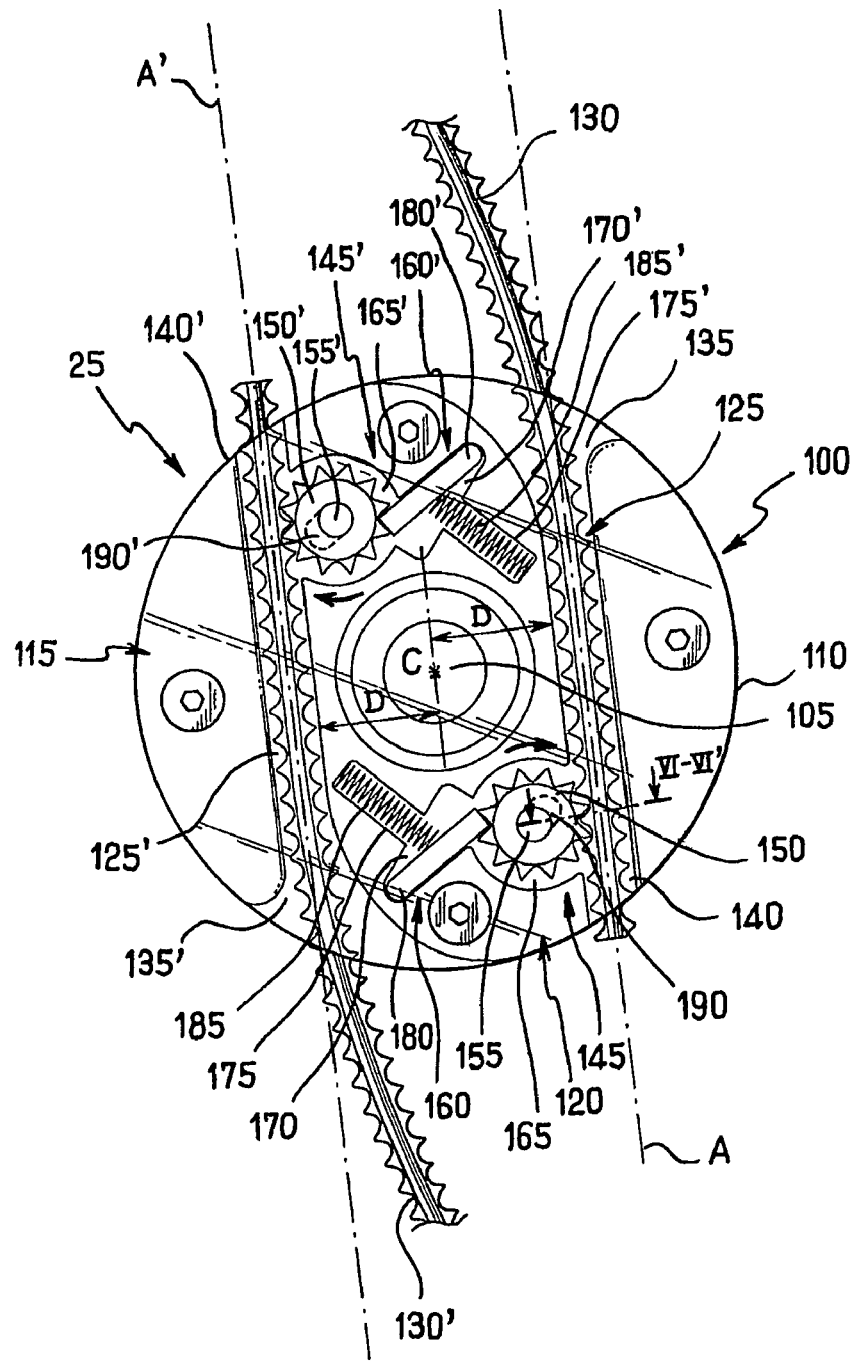
FIG. 5 shows a schematic plan view of a generally disc-shaped intermediate part that forms a part of the cutting head according to the invention, comprising a locking element of a cutting string strand.

FIG. 2 illustrates the cutting head 25 before assembly to the shaft 20, whereas FIGS. 3 and 4 illustrate, respectively in a view with partial cutaway and a view in elevation, the cutting head 25 mounted on the shaft 20. With reference now to FIG. 5, there is shown a disc-shaped part 100 contributing to the implementation of the cutting head and including arrangements for retaining cutting string strands. It will be noted that this disc-shaped part 100 can be one of the parts 100a and 100b in FIGS. 2-4. Said disc-shaped part 100 is provided with a central orifice 105 through which the drive shaft 20 can pass.

This disc-shape part 100 comprises a set of bevels including outer bevels 110 and 115 and a central bevel 120 delimiting internally the portions of the part that are raised and externally the portions of the part that are recessed. The overall contour of the bevels is here circular and follows the contour of the disc, set back at a certain distance from this contour.

Bevels 110, 115 extend in a rectilinear and adjacent manner the one to the other to delimit a first zone 125 of cutting string strand 130, this passageway opening onto the outside at a first opening 135 and a second opening 140, for the outlet of a strand of a cutting string 130. The axis A along which the zone 125 of cutting string strand 130 extends is situated a certain distance, marked D, from the centre C of the disc-shaped part 100, i.e, from the centre C of the central orifice 105, in such a way that the cutting string strand 130 does not extend radially from the cutting head 25.

Moreover, the disc-shape part 100 also comprises, on a section of the string strand passageway zone 125, arrangements for retaining cutting string strands 130. These retaining arrangements are a ratchet wheel 145 including on the one hand, a toothed wheel 150 mounted in rotation around an axis 155 in such a manner that said teeth project in the zone of passageway 125, and on the other hand a ratchet 160 arranged in such a way that the toothed wheel 150 can turn in a given direction to allow the introduction of the cutting string strand 130 in the passageway 125 and cannot turn in the opposite direction to lock the cutting string strand 130 in the passageway 125.

The toothed wheel 150 extends in a cavity 165 formed in the disc-shape part 100, opened into the passageway zone 125 and communicating with a groove 170 in which the ratchet 160 extends, a blind hole 175 being opened into said groove 170, said blind hole receiving a return spring. The rotation axis 155 of the toothed wheel 150 is preferably parallel to the axis C of the central orifice 105 to reduce the size of the cutting head 25. Nevertheless, it is quite obvious that the rotation axis 155 of the toothed wheel 150 may present any orientation without thereby departing from the scope of the invention.

The toothed wheel 150 may comprise between 9 and 15 teeth, and preferably 12 teeth, having advantageously a complementary shape to the teeth shape of a toothed cutting string strand 130 introduced in the passageway zone 125. In this embodiment, the cutting string strand 130 has triangular teeth, such as those disclosed in European Patent Appln. EP 1422990, filed by the Applicant and marketed under the Trademark FLEXIBLADE®. The ratchet 160 includes a cam pin 180 pivotally mounted around an axis, whose distal end can lodge itself between two successive teeth of the toothed wheel 150, and cooperating with a return spring of said ratchet 160 to maintain said cam pin 180 between two successive teeth of said toothed wheel 150. The cam pin 180 is a globally parallelepiped rod and the return spring is a coiled spring 185 extending in the blind hole 175 of the cutting head 25, the end of the coiled spring 185 leaning against the bottom and respectively the cam pin 180, on this median part.

It is quite obvious the ratchet 160 may be substituted for an equivalent ratchet without thereby departing from the scope of the invention.

Figure 6:
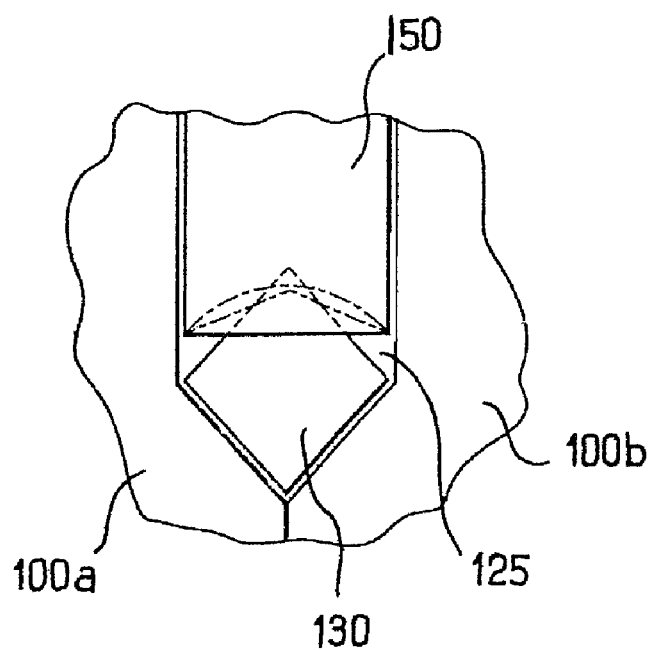
FIG. 6 is a cross-sectional view of the locking element illustrated in FIG. 2.

When a toothed string strand 130 is introduced into the passageway zone 125 from the opening 135, the teeth of said toothed string 130 cooperate with teeth of the toothed wheel 150 to drive it in rotation in the clockwise direction, as shown in FIG. 5. The ratchet 160 keeps free the rotation of the toothed wheel 150. When the cutting head 25 is driven in rotation, the centrifugal force tends to move out the cutting string strand from the passageway zone 125 through the outlet 140. Then the ratchet 160 locks the rotation of the toothed wheel 150 in the counter-clockwise direction to retain the cutting string strand 130 in the passageway zone 125. With reference now to FIG. 6, the teeth of the toothed wheel 150 have a straight edge. Nevertheless the teeth may have a concave edge, of a curvilinear shape or of generally V-shape, represented in dotted line in FIG. 6, to make easier the introduction and the locking of cutting string strand 130 with a circular or squared cross-section or similar.

More generally, any recessed profile can be envisaged at the level of the teeth of the toothed wheel 150 to better receive the string, irrespective of the shape of the cross-section of the latter.

In another embodiment, with reference to FIG. 5, the toothed wheel 150 comprises a central hole 190 with an oblong shape, represented by dashed lines. The toothed wheel 150 further comprises an axis 155 extending into said central hole 190 in such a manner that cutting string strand 130 of different sizes can be introduced in the passageway zone 125. In this way, the toothed wheel can slide along the oblong central hole 190 in function of the diameter of the cutting string strand 130 introduced into the passageway zone 125. Finally, FIG. 5 shows that the disc-shape part 100 comprises, with a symmetry of revolution of 180° relative to the arrangements described above, some second passageway, bearing and locking arrangements for a second strand of string. These arrangements are indicated by the same reference marks plus a "prime" mark. In this manner, the cutting head according to the invention comprises two parallel passageways 125, 125' extending symmetrically on both sides of the rotation axis C of the cutting head 25, each passageway 125, 125' including a ratchet wheel 145, 145'.

Moreover, it is quite obvious that the cutting head may have arrangements including retaining arrangements as disclosed above to provide a cutting head comprising an upper level with two string strands with diametrically opposed outlets, and a lower level with two other string strands with diametrically opposed outlets also, but offset by 90° in relation to the first ones.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A cutting head for a brush cutter or edge trimmer, the head being of the type including at least a passageway for a cutting string and a locking element for engaging and locking said cutting string, wherein said locking element comprises:
    at least one ratchet wheel including a toothed wheel mounted adapted to engage with the cutting string and in rotation around an axis in such a manner that the teeth of the toothed wheel project in the passageway;
    and a ratchet cooperating with the toothed wheel so that the toothed wheel can turn in a given direction to allow the introduction of the cutting string in the passageway and cannot turn in the opposite direction to lock the cutting string in the passageway,
    wherein said ratchet includes a cam pin configured to pivot around an axis, wherein the distal end of the cam pin can lodge itself between two successive teeth of the toothed wheel and cooperate with a return spring of said cam pin to maintain said cam pin between two successive teeth of said toothed wheel,
    and wherein the return wherein said ratchet includes a cam pin configured to pivot around an axis, wherein the distal end of the cam pin can lodge itself between two successive teeth of the toothed wheel and cooperate with a return spring to maintain said cam pin between two successive teeth of said toothed wheel; spring is a coiled spring having a first end and a second end, the coiled spring extending in a blind hole of the cutting head, the first end of the coiled spring leaning against the bottom of the blind hole and the second end of the coiled spring leaning against the cam pin.

2. The cutting head according to claim 1 wherein the coiled spring leans against the median part of the cam pin.

3. A cutting head for a brush cutter or edge trimmer, the head being of the type including at least a passageway for a cutting string and a locking element for engaging and locking said cutting string, wherein said locking element comprises:
    at least one ratchet wheel including a toothed wheel mounted adapted to engage with the cutting string and in rotation around an axis in such a manner that the teeth of the toothed wheel project in the passageway;
    and a ratchet cooperating with the toothed wheel so that the toothed wheel can turn in a given direction to allow the introduction of the cutting string in the passageway and cannot turn in the opposite direction to lock the cutting string in the passageway,
    wherein the toothed wheel comprises a central hole having an oblong shape, an axis extending into said central hole in such a manner that cutting string strands of different sizes can be introduced into the passageway.

4. A cutting head for a brush cutter or edge trimmer, the head being of the type including at least a passageway for a cutting string and a locking element for engaging and locking said cutting string, wherein said locking element comprises:
    at least one ratchet wheel adapted to engage with the cutting string and including a toothed wheel mounted in rotation around an axis in such a manner that the teeth of the toothed wheel project in the passageway;
    and a ratchet cooperating with the toothed wheel so that the toothed wheel can turn in a given direction to allow the introduction of the cutting string in the passageway and cannot turn in the opposite direction to lock the cutting string in the passageway.

5. The cutting head according to claim 4 wherein said ratchet includes a cam pin configured to pivot around an axis, wherein the distal end of the cam pin can lodge itself between two successive teeth of the toothed wheel and cooperate with a return spring to maintain said cam pin between two successive teeth of said toothed wheel.

6. The cutting head according to claim 5 wherein the cam pin is a parallelepiped rod.

7. The cutting head according to claim 4 wherein the toothed wheel comprises between 9 and 15 teeth.

8. The cutting head according to claim 7 wherein the toothed wheel comprises 12 teeth.

9. The cutting head according to claim 4 wherein the teeth of the toothed wheel have a complementary shape to the teeth shape of a toothed cutting string introduced in the passageway.

10. The cutting head according to claim 4 wherein the teeth of the toothed wheel have a straight edge.

11. The cutting head according to claim 4 wherein the teeth of the toothed wheel have a concave edge.

12. The cutting head according to claim 11 wherein the concavity of the teeth edges have a curvilinear shape.

13. The cutting head according to claim 11 wherein the concavity of the teeth edges have a generally V-shape.

14. The cutting head according to claim 4 further comprising two parallel passageways extending symmetrically on both sides of a rotation axis of the cutting head, each passageway including a ratchet wheel.

\* \* \* \* \*